June 3, 1930.  G. H. KNIGHT  1,762,063

MECHANICAL MOVEMENT

Filed June 13, 1927  3 Sheets-Sheet 1

Inventor
George H. Knight
By Attorneys
Southgate Fay & Hanley

June 3, 1930.  G. H. KNIGHT  1,762,063
MECHANICAL MOVEMENT
Filed June 13, 1927   3 Sheets-Sheet 2

Inventor
George H. Knight
By Attorneys
Southgate Fay & Hasley

June 3, 1930.  G. H. KNIGHT  1,762,063

MECHANICAL MOVEMENT

Filed June 13, 1927   3 Sheets-Sheet 3

Inventor
George H. Knight
By Attorneys
Southgate Fay & Hawley

Patented June 3, 1930

1,762,063

UNITED STATES PATENT OFFICE

GEORGE H. KNIGHT, OF TORRINGTON, CONNECTICUT, ASSIGNOR TO THE HENDEY MACHINE COMPANY, OF TORRINGTON, CONNECTICUT, A CORPORATION OF CONNECTICUT

MECHANICAL MOVEMENT

Application filed June 13, 1927. Serial No. 198,369.

This invention relates to an adjustable mechanical motion for changing a constant reciprocating motion into an intermittent rotary motion which can be varied.

The principal objects of the invention are to provide a simple and convenient means for accomplishing the above mentioned result; to provide a convenient self-contained means for performing the adjustment which will permit of as wide variations in the resulting motion as may be desired, and to connect therewith an indicator showing automatically the feed or other result produced.

Other objects and advantages of the invention will appear hereinafter.

Reference is to be had to the accompanying drawings in which

Figure 1:
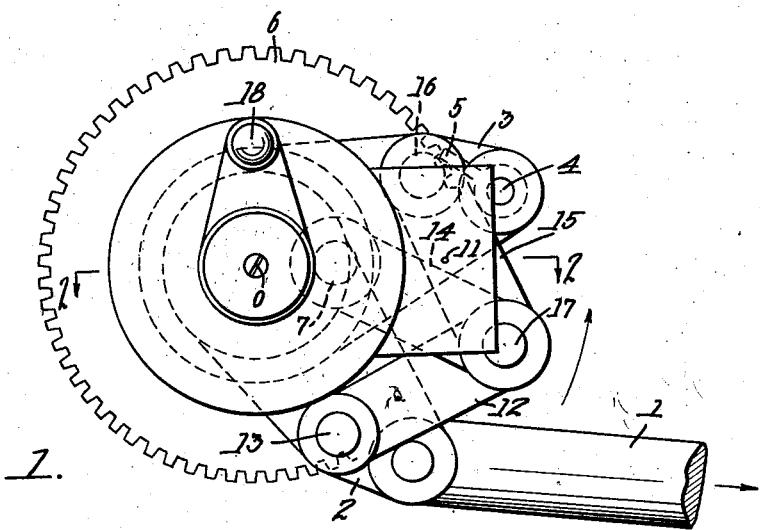
Fig. 1 is an end view of a mechanical motion constructed in accordance with this invention.
Figure 2:
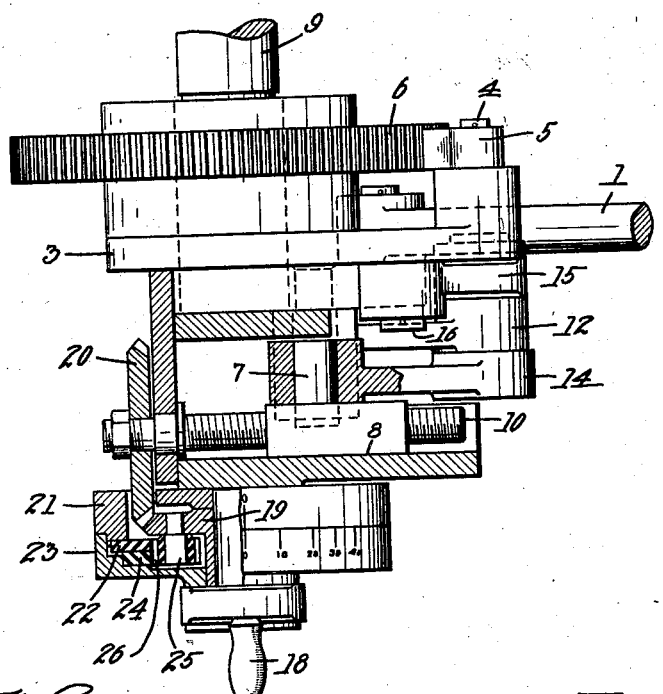
Fig. 2 is a plan of the same partly on a central radial section line 2—2 of Fig. 1.
Figure 3:
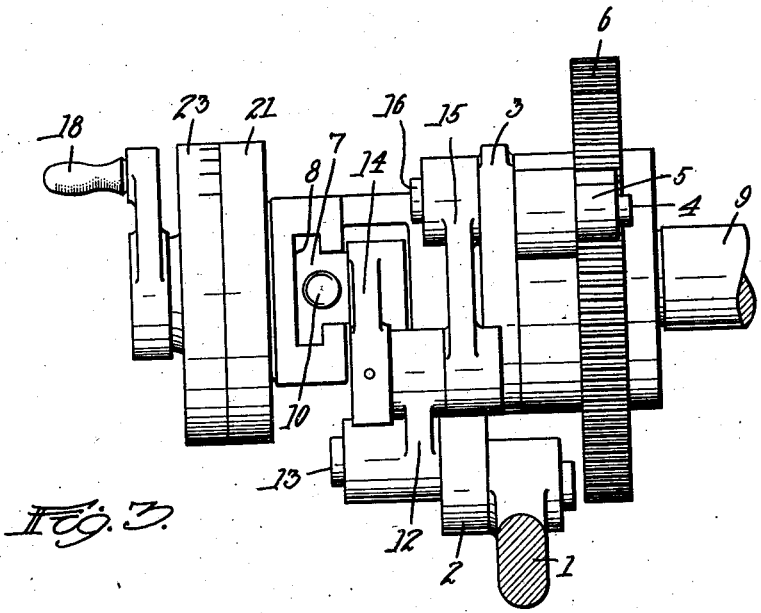
Fig. 3 is a side view.

The invention is shown as operative for the purpose of transmitting the reciprocating motion of the driving element in the form of a connecting rod 1 to a driven element in the form of gear 6 as an intermittent rotary feed motion. The connecting rod is operated by any well known means to have a constant motion or reciprocation and means is provided in accordance with this invention for varying the feed of the gear 6. The connecting rod 1 is pivotally connected with an operating lever 2 which is pivoted to swing freely on the axis of the stationary cast steel feed stud 9. This lever 2 is provided with a pivot stud 13 to which a link 12 is pivotally connected and on the other end of this link 12 is a pivot stud 17 on which are pivotally connected two links 14 and 15 shown in Fig. 1 projecting in different directions from the stud 17. A stud 16 is mounted on a driven rocker arm 3 also pivoted on the feed stud 9. These various links are all mounted in different planes and the studs are all capable of passing each other so that a freedom of motion is secured by which the studs can come into registration with each other axially, or even past each other, if desired, and there will be no parts projecting to prevent this.

It will be seen that the rocker arm 3 oscillates about the feed stud 9 with the axis 0 as a center. It carries a stud 4 on which is pivotally mounted a pawl 5 which engages the teeth of the gear 6 which is loose on the feed stud 9. Obviously the oscillation of the rock arm 3 determines the amount of feed per stroke of the connecting rod 1. The mechanism herein shown is designed for the purpose of transmitting this constant motion of this rod 1 to the rocker arm 3 and gear 6 and in such adjusted proportions as may be desired. The way of operating the feed from the gear 6 is not shown as any usual method can be used.

The end of the link 14 is provided with a stud 7 having a T-shaped head. The feed stud 9 has a rectangular end provided with a T-slot 8 for receiving the head of the stud 7. This head is provided with a screw thread and the frame of the feed stud 9 is provided with a screw 10 which can be turned on its own axis but not reciprocated. By turning this screw the stud 7 will be adjusted along the slot 8.

On the frame of the feed stud 9 is mounted an arm and handle 18 rotatable on an axis concentric with the axis of the feed stud 9. This arm with its handle is rotated on said axis turning a bevel gear 19 also mounted on that axis. This gear in turn, by a bevel gear 20 fixed on the shaft of the screw 10, turns that screw.

For the purpose of indicating the position to which the stud 7 is adjusted along the slot 8 and therefore the corresponding amount of motion of the stud 16, I have provided a stationary disc 21 on the frame of the feed stud 9. On this disc is fixed an internal gear 22. I also have provided a concentric rotatable disc 23 which carries an internal gear 24. The gears 22 and 24 have the same diameters but unequal numbers of teeth.

The bevel gear 19 carries a stud 25 on which is a pinion 26 which is long enough so that it meshes with both of the gears 22 and 24. Now the turning of the handle 18 causes a differential motion to be set up between the stationary disc 21 and the rotatable disc 23. A zero mark is placed preferably on the disc 21 and a scale marked on the disc 23 to designate the motion obtained in accordance with the adjustment provided by the rotation of the handle 18. This scale may represent feed per stroke, feed per revolution or inches per minute. In the preferred embodiment of the invention the gear 6 is used to drive an element of a machine tool. Therefore the numbers appearing on the index dial on the index 23 may represent thousandths of an inch advance for each reciprocation of the operating rod 1.

Figure 4:
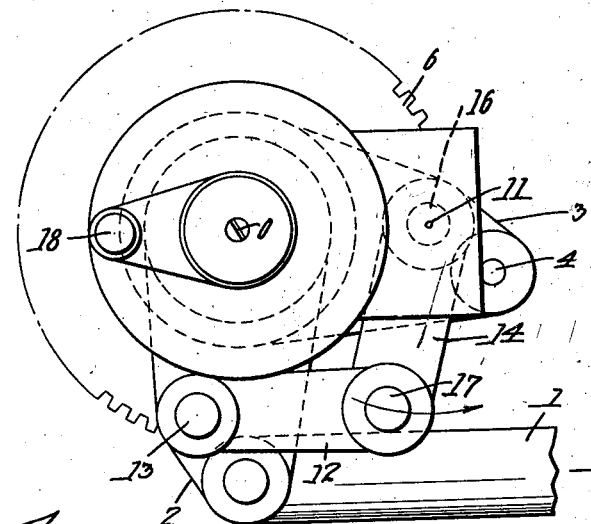
Fig. 4 is a view similar to Fig. 1 with the parts in a different position.

I have used the point 11 to indicate that point at which the two studs 7 and 16 will coincide axially if the former is adjusted out to that point as indicated in Fig. 4. In that case, which we may call a limiting position, the two links 14 and 15 are in registration with each other and therefore they swing about a fixed point producing no motion in the arm 3 in response to the reciprocation of the connecting rod 1. Whenever the stud 7 is adjusted away from the point 11 in either direction, some motion will be transmitted to the rocker arm 3. When the stud 7 is adjusted to the center 0 all three links 12, 14 and 15 and also the lever 2 and arm 3 will swing about the center 0. In this case the angular travel of the arm 3 is just equal to that of the lever 2 caused directly by the motion of the connecting rod. It will be obvious therefore that the angular motion of the arm 3 increases from zero as the stud 7 is adjusted from the point 11 to the point 0 and beyond. At the point 0 it has a motion equal to that imparted to the mechanism by the connecting rod 1. The gear 6 has an intermittent motion which varies from zero to the maximum according to the position of the stud 7. The links 14 and 15 are of substantially equal length.

Figure 5:
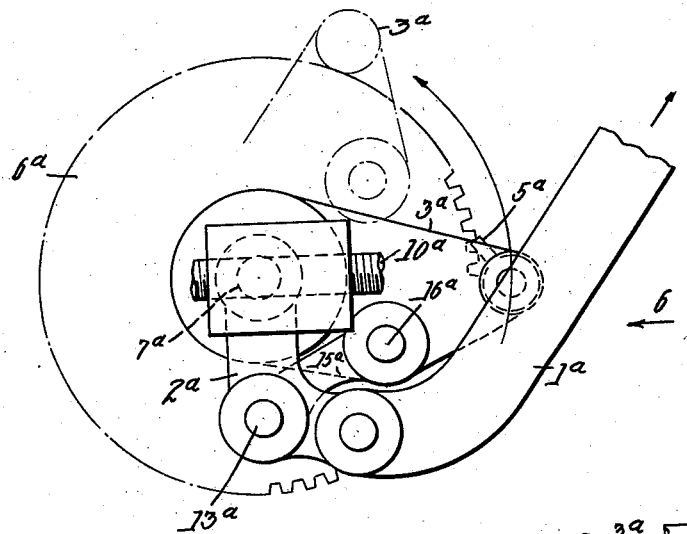
Fig. 5 is an end view showing certain modifications which can be made in accordance with this invention.
Figure 6:
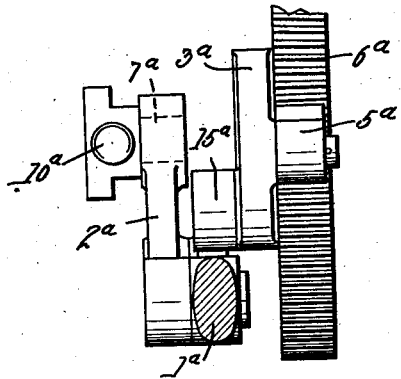
Fig. 6 is an elevation taken in the direction of the arrow 6 in Fig. 5.
Figure 7:
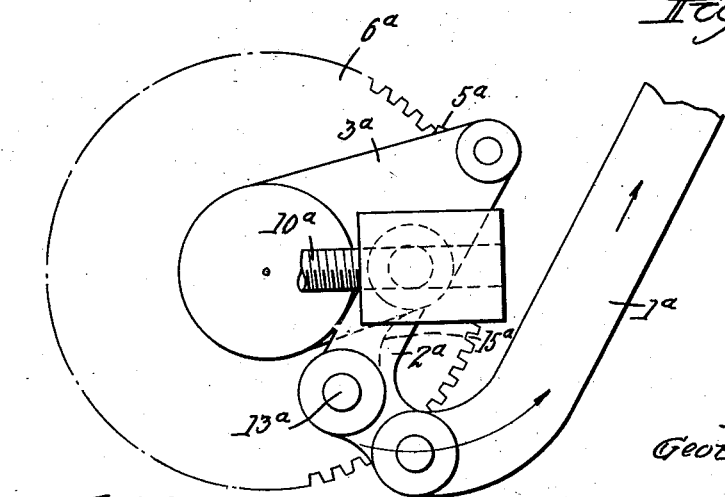
Fig. 7 is a view similar to Fig. 5 showing the parts in a different adjusted position.

In the form shown in Figs. 5, 6 and 7 less mechanism is required, the construction being more simple. Here a motion is imparted to the device by a connecting rod $1^a$ which is pivoted to a bell crank $2^a$. To this bell crank is pivoted a pivot stud $7^a$ which is adjusted by a screw $10^a$ as before. The rocker arm $3^a$ is substantially like the one previously described but it has a stud $16^a$ connected by a link $15^a$ to the stud $13^a$ on the lever $2^a$ which is pivoted on the stud $7^a$.

The operation of the connecting rod $1^a$ swings the lever $2^a$ on the stud $7^a$. The parts can be adjusted so that the two pivot studs $16^a$ and $7^a$ are in axial registration with each other as shown in Fig. 7 which is one extreme position of the adjustment. The pawl $5^a$ is mounted for engagement with the gear $6^a$ as in the other form.

In both forms of the invention illustrated the constant reciprocating motion of the connecting rod is transmitted to the feed gear in the form of an intermittent rotary motion. The amplitude of the vibrations of the intermittent motion is adjusted in the manner described and within the limits specified. No other adjustment has to be made in order to change the length of the stroke of the operating pawl and for that reason the adjustment is very simple and the construction also. Means for showing the amount of the adjustment illustrated is also of a simple character which cooperates with the device without unduly complicating it. It can be applied in the same way to the second form shown.

Although I have illustrated and described only two forms of the invention I am aware of the fact that other modifications can be made therein by any person skilled in the art without departing from the scope of the invention as expressed in the claims.

Therefore, I do not wish to be limited in these respects, but what I do claim is:—

1. In a mechanical movement, the combination with a driving element having a to and fro motion and a driven rotary element, of a pivoted lever connected with the driving element to be oscillated thereby, a rock arm pivoted to swing on the axis of the driven element, means on said rock arm for imparting an intermittent rotary motion to the driven element as the rock arm oscillates, a link for transmitting the oscillating motion of the lever to the rock arm, a pivot connecting the link and rock arm, a link connecting said link with the pivoted lever, a third link connecting the first link with the rock arm, and means for adjusting the pivot between the rock arm and the first named link, in a general radial direction with respect to the rotary driven element.

2. In a mechanical movement, the combination with a driving element having a to and fro motion and a driven rotary element, of a pivoted lever connected with the driving element to be oscillated thereby, a rock arm pivoted to swing on the axis of the driven element, means on said rock arm for imparting an intermittent rotary motion to the driven element as the rock arm oscillates, an adjustable stud, means for connecting the stud with the lever, means movable to varying angles therewith for connecting the stud with the rock arm and means for adjusting the position of the stud to vary the intermittent motion of the driven element.

3. In a mechanical movement, the combination with a driving element having a to and fro motion and a driven rotary element, of a pivoted lever connected with the driving element to be oscillated thereby, a rock arm pivoted to swing on the axis of the driven element, means on said rock arm for imparting an intermittent rotary motion to the driven element as the rock arm oscillates, a stud adjustable to different positions in which it is stationary as the device operates, a stud on the rock arm, a link connected at one end to the adjustable stud to swing thereon, and a link pivoted at one end to the other stud, the other ends of said links being pivoted together, said lever being connected to the pivotal point between said links for oscillating said other stud.

4. In a mechanical movement, the combination with a driving element having a to and fro motion and a driven rotary element, of a pivoted lever connected with the driving element to be oscillated thereby, a rock arm pivoted to swing on the axis of the driven element, means on said rock arm for imparting an intermittent rotary motion to the driven element as the rock arm oscillates, a stud, three links pivoted to said stud, one of them being pivoted to the lever and another to the rock arm, and a stud adjustable in a radial direction to a desired point and connected with the third link.

5. In a mechanical movement, the combination with a driving element having a to and fro motion and a driven rotary element, of a pivoted lever connected with the driving element to be oscillated thereby, a rock arm pivoted to swing on the axis of the driven element, means on said rock arm for imparting an intermittent rotary motion to the driven element as the rock arm oscillates, a stud, three links pivoted to said stud, one of them being pivoted to the lever and another to the rock arm, and a stud adjustable in a radial direction at a desired point and connected with the third link, the third link being located in the angle between the other two, whereby the adjustment of the adjustable stud will vary the angles between the three links and the oscillation of the rock arm.

6. In a mechanical movement, the combination with a lever and a rock arm pivoted on the same axis, means pivotally connected with the lever for oscillating it, a link pivoted to the lever and projecting toward the rock arm, a second link pivoted to the rock arm and also pivoted to the end of the first link, a third link pivoted to the point at which the two links are pivoted together and extending toward the center of the device, a stud on which the opposite end of the third link is pivoted, means for adjusting said stud toward and from the center, whereby the oscillation of the lever will be transmitted to the rock arm constantly but with an amplitude determined by the position of the adjustable stud, and means on the rock arm for transmitting the motion to a driven element intermittently and in a circular direction.

7. In a mechanical movement, the combination with an operating lever and a rock arm pivoted on the same axis, a stud adjustable toward and from the center of the device, a radial screw connected with said stud for adjusting it, a bevel gear on said screw, a second bevel gear meshing therewith, an operating handle connected with the second bevel gear to control the stud, a stud mounted on the rock arm, a link pivotally connected with the adjustable stud at one end, a link pivotally connected at one end to the stud on the rock arm, the opposite ends of the two links being pivoted together, means for swinging the pivoted ends of the two links from the operating lever, a driven toothed wheel, and a ratchet pawl carried by the rock arm and acting on the teeth of said gear to give the gear an intermittent rotary motion.

8. In a mechanical movement, the combination with an operating lever and a rock arm, an adjustable stud, a screw connected with said stud for adjusting it, a stud mounted on the rock arm, a link pivotally connected with the adjustable stud at one end, a link pivotally connected at one end to the stud on the rock arm, the opposite ends of the two links being pivoted together, means for swinging the pivoted ends of the two links from the operating lever, a driven toothed wheel, a ratchet pawl carried by the rock arm and acting on the teeth of said gear to give the gear an intermittent rotary motion, gearing connected with said screw for adjusting the adjustable pivot stud, a shaft connected with said gearing having a handle for rotating the shaft, a dial graduated to show the various positions of the adjustable stud, a stationary zero mark cooperating with the dial, and differential means to rotate the dial a fraction of a revolution while the handle makes a number of complete revolutions.

9. In a mechanical movement, the combination with an operating lever and a rock arm, an adjustable stud, a screw connected with said stud for adjusting it, a gear on said screw, a second gear meshing therewith, an operating handle connected with the second gear, a stud mounted on the rock arm, a link pivotally connected with said adjustable stud at one end, a link pivotally connected at one end to the stud on the rock arm, the opposite ends of the two links being pivoted together, means for swinging the pivoted ends of the two links from the operating lever, a driven toothed wheel, a ratchet pawl carried by the rock arm and acting on the teeth of said gear to give the gear an intermittent rotary motion, a shaft connected with said gearing, said shaft having an operating handle secured thereto, a movable dial graduated to show the various positions of the adjustable stud, a stationary zero mark, an internal gear mounted on the movable dial, a concentric stationary internal gear of a slightly different number of teeth, and a pinion meshing with both concentric gears and revolvable with said shaft.

10. In a mechanical movement, the combination with an operating lever and a rock arm, an adjustable stud, means for connecting the operating lever, rock arm and stud, a driven toothed wheel, a ratchet pawl carried by the rock arm and acting on the teeth of said gear to give the gear an intermittent rotary motion, gearing for adjusting the stud, a shaft connected with said gearing having a handle for rotating the shaft, a movable dial graduated to show the various positions of the adjustable stud, a stationary zero mark, and differential means to rotate the dial a fraction of a revolution while the handle makes a number of complete revolutions, said means comprising a stud mounted rotatably with respect to the handle, an internal gear mounted on the movable dial, a concentric stationary internal gear of a slightly different number of teeth, and a pinion meshing with both concentric gears and revolvable with said handle.

11. In a mechanical movement, the combination with an operating lever and a rock arm pivoted on the same axis, a stud adjustable toward and from the center of the device, a screw connected with said stud for adjusting it, a gear on said screw, a second gear meshing therewith, an operating handle connected with the second gear to control the stud, a stud mounted on the rock arm, links pivotally connecting the adjustable stud with the stud on the rock arm, means for swinging the links from the operating lever, a driven wheel, and means carried by the rock arm to give the wheel an intermittent rotary motion.

In testimony whereof I have hereunto affixed my signature.

GEORGE H. KNIGHT.